United States Patent
Sangster et al.

(10) Patent No.: US 11,009,418 B2
(45) Date of Patent: May 18, 2021

(54) PENCIL GAUGE WITH DIGITAL DISPLAY

(71) Applicant: ILLINOIS TOOL WORKS INC., Glenview, IL (US)

(72) Inventors: Brendan Sangster, San Luis Obispo, CA (US); Carey C. Costle, Tucson, AZ (US); Brendan P. Kelso, Atascadero, CA (US); Nolan Mott, Paso Robles, CA (US); Chad Ellman, Avila Beach, CA (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 221 days.

(21) Appl. No.: 15/919,383

(22) Filed: Mar. 13, 2018

(65) Prior Publication Data

US 2018/0259412 A1    Sep. 13, 2018

Related U.S. Application Data

(60) Provisional application No. 62/470,619, filed on Mar. 13, 2017.

(51) Int. Cl.
*G01L 17/00* (2006.01)
*B67B 7/16* (2006.01)

(52) U.S. Cl.
CPC ............. *G01L 17/00* (2013.01); *B67B 7/16* (2013.01)

(58) Field of Classification Search
None
See application file for complete search history.

(56) References Cited

U.S. PATENT DOCUMENTS

| | | | | |
|---|---|---|---|---|
| 3,067,618 A | | 12/1962 | Briechle | |
| 4,250,759 A | * | 2/1981 | Vago | G01L 9/04 73/146.8 |
| 4,501,142 A | * | 2/1985 | Huang | G01L 17/00 73/146.8 |
| 5,117,684 A | * | 6/1992 | Hwang | G01L 17/00 116/34 R |
| 5,614,669 A | * | 3/1997 | Sopcisak | B25B 27/0057 73/146.8 |
| 6,968,734 B2 | * | 11/2005 | Tseng | G01L 17/00 73/146.8 |
| 7,013,722 B2 | * | 3/2006 | Little | G01L 17/00 73/146.8 |
| 7,185,533 B2 | * | 3/2007 | Lee | G01K 1/045 324/464 |
| 7,383,724 B2 | * | 6/2008 | Petrucelli | G01L 17/00 73/146 |
| 7,721,592 B2 | * | 5/2010 | Bucknell | G01L 17/00 73/146.8 |

(Continued)

*Primary Examiner* — Natalie Huls
*Assistant Examiner* — Jermaine L Jenkins
(74) *Attorney, Agent, or Firm* — Pauley Erickson & Swanson

(57) ABSTRACT

A pencil tire gauge with a tubular pencil gauge housing and having a first end and an opposite second end with a linear longitudinal centerline axis through a center of the first end and second end. The first end has a nozzle inlet on the longitudinal centerline and adapted to receive a tire valve stem. The first end and nozzle inlet are on and tilted offset with respect to the longitudinal centerline, and the nozzle inlet is offset at an angle of less than about 10°.

17 Claims, 2 Drawing Sheets

(56) References Cited

U.S. PATENT DOCUMENTS

| | | | | |
|---|---|---|---|---|
| 8,015,864 B2* | 9/2011 | Petrucelli | ............... | G01L 17/00 |
| | | | | 73/146.8 |
| 9,194,385 B1* | 11/2015 | Dooley | ................... | B60C 25/02 |
| 2004/0187567 A1* | 9/2004 | Durr | ....................... | G01L 17/00 |
| | | | | 73/146 |

* cited by examiner

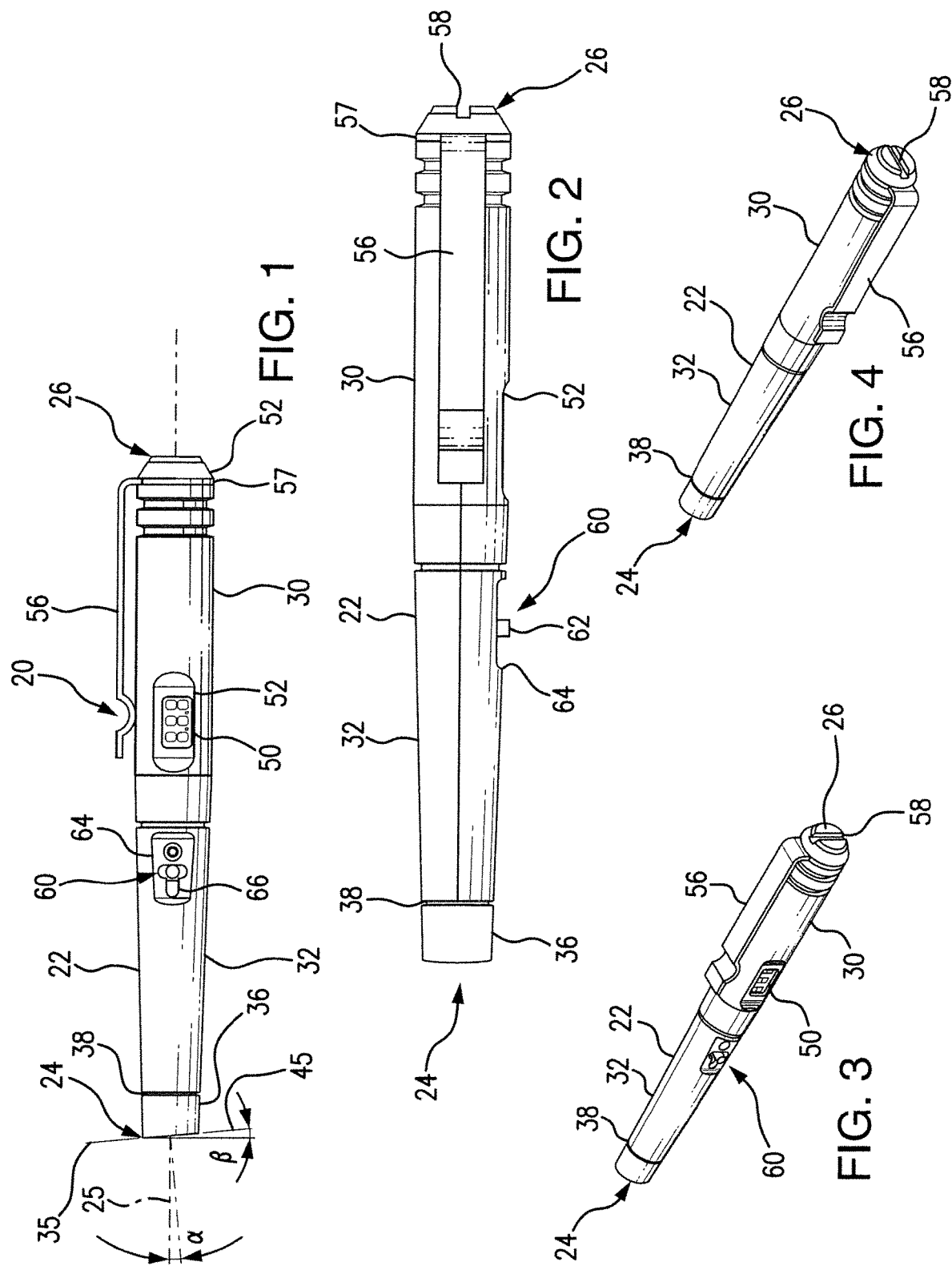

PENCIL GAUGE WITH DIGITAL DISPLAY

CROSS REFERENCE TO RELATED APPLICATION

This application claims priority to U.S. Provisional Application Ser. No. 62/470,619, filed on 13 Mar. 2017. This U.S. Provisional Application is hereby incorporated by reference herein in its entirety and is made a part hereof, including but not limited to those portions which specifically appear hereinafter.

BACKGROUND OF THE INVENTION

Field of the Invention

The invention relates to a gauge device for determining pressure within an object such as a tire or other inflated object, and more particularly to a handheld pencil gauge.

Description of Prior Art

There are many different pressure gauges for determining tire pressure. One type of pressure gauge is referred to as a "pencil gauge", due to a pencil-like size and shape. U.S. Pat. No. 3,067,618 shows a representative pencil tire pressure gauge where a spring-loaded pressure indicator bar with readable numbers is moved outward at one end by air entering through a piston at an opposite head end.

Pencil tire gauges are popular due to the small size and ease of use. There is thus a continuing need for improved pencil tire gauges.

SUMMARY OF THE INVENTION

The present invention provides an apparatus for determining pressure within an object such as a tire or other inflated object. In embodiments of this invention, the apparatus is a pencil gauge for checking a tire pressure. The gauge has a pencil style housing for holding in a user's hand, and is easily storable in a pocket or toolbox, etc. The gauge and/or its housing desirably have a single constant and linear longitudinal center axis between a first nozzle end and an opposing second end. The gauge has a nozzle inlet at a first end of the housing that corresponds to and receives a tire valve stem. A pressure detection mechanism is disposed within the housing and provides a pressure measurement that is displayed on a digital display attached to a side of the housing.

In embodiments of this invention, the housing is tubular, desirably a metal cylindrical tube, and tapered toward the nozzle end. The nozzle end of the gauge is desirably centered on the centerline and facing a direction between 0° and 10° relative to the centerline. The nozzle end is desirably smaller in diameter than the remainder of the gauge or housing, thereby providing a sleek, non-bulbous look without a widened nozzle head. To improve use, the nozzle inlet and/or nozzle end of the gauge is disposed in a slanted or angled orientation on and with respect to the central longitudinal axis of the gauge housing.

The invention includes a tire gauge with a tubular pencil gauge housing and having a first end and an opposite second end, and including a cylindrical section toward the second end and a tapered section extending from the cylindrical section toward the first end. The first end has a diameter that is less than the second end, and a nozzle inlet adapted to receive a tire valve stem. The gauge and housing desirably have a single constant and linear longitudinal centerline axis between and through the first end and the opposing second end. The nozzle inlet is tilted offset across and desirably at an angle with respect to a longitudinal centerline of the housing of less than about 10°. The first end is desirably centered on, but tilted offset across and at a non-perpendicular angle with respect to, a longitudinal centerline of the housing.

The invention also includes a tire gauge with a metal pencil gauge housing and having a first end and an opposite second end along a longitudinal centerline of the housing. The housing has a cylindrical section toward the second end and a tapered section extending from the cylindrical section toward the first end, with the first end having a diameter that is less than the second end. A nozzle inlet at the first end includes a pin, and the nozzle inlet and the pin are each intersected by the longitudinal centerline of the housing and each slanted offset at an angle of about 2° to about 10° with respect to the longitudinal centerline of the housing. The first end is also angled to correspond to the nozzle end pin.

BRIEF DESCRIPTION OF THE DRAWINGS

The above-mentioned and other features and objects of this invention will be better understood from the following detailed description taken in conjunction with the drawings wherein:

FIG. 1 is a side view of a pressure gauge according to one embodiment of this invention;

FIG. 2 is a top view of the pressure gauge according to FIG. 1;

FIGS. 3 and 4 are perspective views of the pressure gauge according to FIG. 1;

DESCRIPTION OF PREFERRED EMBODIMENTS

Figure 5:
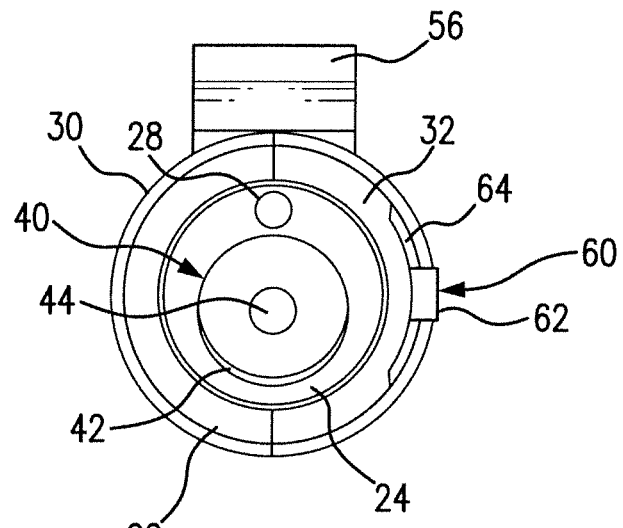
FIGS. 5 and 6 are opposing end views of the pressure gauge according to FIG. 1.
Figure 6:
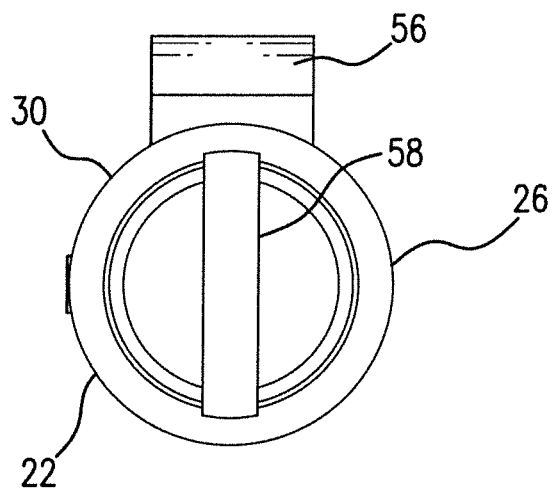

FIGS. 1-6 show a tire pressure gauge 20, also referred to as a tire gauge, according to one embodiment of this invention. The gauge 20 is a pencil gauge having a pencil gauge housing 22. As used herein, references to "pencil" or "pencil gauge" are to be understood as referring to a gauge configuration having a pencil-like shape, in that the gauge has a long, slender shape about the size of a pencil and that can be held in a hand like a pencil.

The housing 22 is tubular and encloses a chamber for gauge components. The tubular housing 22 can have any suitable cross sectional shape, such as, without limitation, a circle, triangle or square, but it is desirably cylindrical as shown. The gauge 20 has a first end 24 and an opposite second end 26, each positioned centered on a linear longitudinal axis or centerline 25 of the gauge 20. The housing 22 preferably is at least partially tapered about the longitudinal centerline 25 and toward the first end 24, such as providing the first end 24 with a diameter that is less than the second end 26. In the embodiment shown in FIGS. 1-4, the gauge 20 and housing 22 include a cylindrical section 30 toward the second end 26 and a tapered section 32 extending from the cylindrical section 30 toward the first end 24. The cylindrical section 30 desirably has a constant internal and/or external diameter, and the transition from the cylindrical section 30 to the tapered section 32 is at or about the midpoint along the longitudinal length of the gauge 20 or housing 22. In preferred embodiments of this invention, the housing is a cast metal housing, although the housing can include or be fully formed of plastic as well.

In embodiments of this invention, as shown in FIGS. 1-5, the external surface of the tapered section 32 decreases in diameter from the cylindrical section 30 through and at the first end 24. As such, there is no bulbous or widened head at the first end 24, as is common in conventional pencil tire gauges. The first end 24 of the housing 22 is elliptical due to the angled configuration, as shown in FIG. 5, with a center of the ellipse (or circle or other suitable shape) at or on the longitudinal centerline 25 of the housing 22 and with an outer surface diameter that is less than the cylindrical section 30 and the second end 26. In embodiments of the invention, the first end 24 can be formed integrally to the housing 22 or formed by a separate nozzle head 36 attached, such as by threaded attachment 38, to the gauge 20 or the remainder of the housing 22. The outer surface of a separate nozzle head 36 is desirably tapered to match the rest of the tapered section 22 and continues the decreasing outer diameter of the tapered section 32 to the first end 24, which has a diameter smaller than the housing 22 at attachment 38.

As best shown in FIG. 5, the gauge 20 includes a nozzle inlet 40 at the first end 24. The nozzle inlet 40 is adapted to receive a tire valve stem, and can be or receive a Schrader, Dunlop, or Presta valve, depending on need. The nozzle inlet 40 of FIG. 5 includes a cylindrical recess 42 for receiving an end of a Schrader tire valve stem. A pin 44 within the recess 42 connects to a corresponding pin of the tire valve stem to open both the tire valve and an air passage adjacent or about the pin 42 to allow air into the gauge 20 for pressure measuring. The pin mechanism can be any suitable pin/valve mechanism known in the art of tire gauges, and can be connected to a sealing element, such as forming a piston, to open an air passageway of the gauge 20. As shown in FIG. 5, embodiments of this invention desirably include a light 28 at the first end 24 of the housing to light the tire valve stem for ease of use. The light 28 is preferably a light emitting diode of any suitable color that can be activated by a switch or button on the housing 22 or at the first end 24 or second end 26.

The nozzle inlet 40, nozzle recess 42, and pin 44 can be positioned straight in parallel alignment with and along the longitudinal centerline 25 of the gauge 20. In an alternative embodiment, as shown in FIG. 5, at least the nozzle recess 42 and pin 44, and desirable also the nozzle head 36 and/or first end 24, are each angled with respect to the centerline 25 to promote use in connecting to a tire stem. In embodiments of this invention, the nozzle recess 42 and pin 44 is slanted at an angle $\alpha$ to or from the longitudinal centerline 25, as shown in FIG. 1. In currently preferred embodiments of this invention, angle $\alpha$ is or is less than about 10° (e.g., between 0° and about 10°), desirably about 2° to about 10°, and preferably about 5°.

As shown in FIG. 5, the nozzle recess 42 and pin 44 are still positioned along and/or on the centerline 25, with the centerline 25 intersecting the nozzle recess 42 and pin 44 in the tilted or slanted position that has them extending over and across the centerline 25. As shown in FIG. 1, in embodiments of this invention, the first end 24 of the gauge is at a non-perpendicular angle to and across the centerline 25, tilted in the same direction as the nozzle inlet 40 and pin 44 shown in FIG. 5 and forms a slight non-circular ellipse. The angled first end 24 of the housing 22 and/or nozzle head 36 promotes use in the same manner as the angled nozzle inlet 40. The angled first end 24 is preferably angled $\alpha$ corresponding amount to the angled nozzle inlet 40, wherein a first end surface plane 45 is perpendicular to a centerline of the nozzle inlet 40 and pin 42. As shown in FIG. 1, an end plane 45 of the first end 24 is offset at the angle $\beta$, such as less than 10° and preferably about 5°, from a plane 35 perpendicular to the longitudinal centerline 25. In embodiments of this invention, the angle $\beta$ is equal to the angle $\alpha$, and the first end 24 surface plane 45 is disposed perpendicular to a centerline axis of the nozzle recess 42 and pin 44.

The gauge 20 includes a digital display 50 attached to and viewable on a side of the housing 22. The digital display 50 is in display combination with a pressure detection mechanism within the housing 22. During use, air from a tire enters the housing 22 through the nozzle inlet 40 and the pressure detection mechanism measures the air pressure and the measured air pressure is displayed on the digital display 50. Any suitable display can be incorporated, such as a LCD display set in recess 52. The internal pressure detection mechanism can be any suitable mechanism, such as, without limitation, a strain gauge. With a strain gauge, air from the tire goes into the housing 22 and pushes against the strain gauge. The resultant flexing of the strain gauge changes its resistance. This resistance change is input to a microprocessor where the resistance change is converted to a binary signal used to drive LCD readout.

The second end 26 of the gauge 20 includes an internal battery compartment and a removable cap 52 for access to the battery compartment. The cap 52 is preferably a threaded cap that screws onto the cylindrical section 30 at the second end 26 to complete the housing 22, but can alternatively be, for example, a snap or twist lock cap. The cap 52 of FIG. 1 has a further function of securing on the separately formed clip 56 at the second end 26. The clip 56, which can be useful for hooking to a pocket or other object, extends along the cylindrical section 30 of the housing 22 and includes a ring end 57 that is inserted over a threaded end of the housing 22 and secured by the tightened cap 52. The cap 52 can further include integrated functional elements, such as a bottle opener 58 shown in FIGS. 2-4 and 6.

The gauge 20 of FIG. 1 further includes a pressure release valve 60. The valve 60 is used for emptying the air pressure from the housing 22, such as for resetting the pressure detection mechanism and display 50 or letting air out of an over-inflated tire. Any suitable release valve can be incorporated. The embodiment of FIG. 1 includes a sliding and/or spring loaded pressure bleeder 62 disposed in recess 64 and movable within channel 66 to open the bleeder 62. The bleeder 62 is coaxially aligned with the digital display 50 along one side of an outer surface of the housing 22. In the illustrated embodiment, the display 50 is within the cylindrical section 30 and the valve 62 is within the tapered section 32. Various sizes, shapes and configurations are available for the valve and the display, depending on need.

Figure 7:
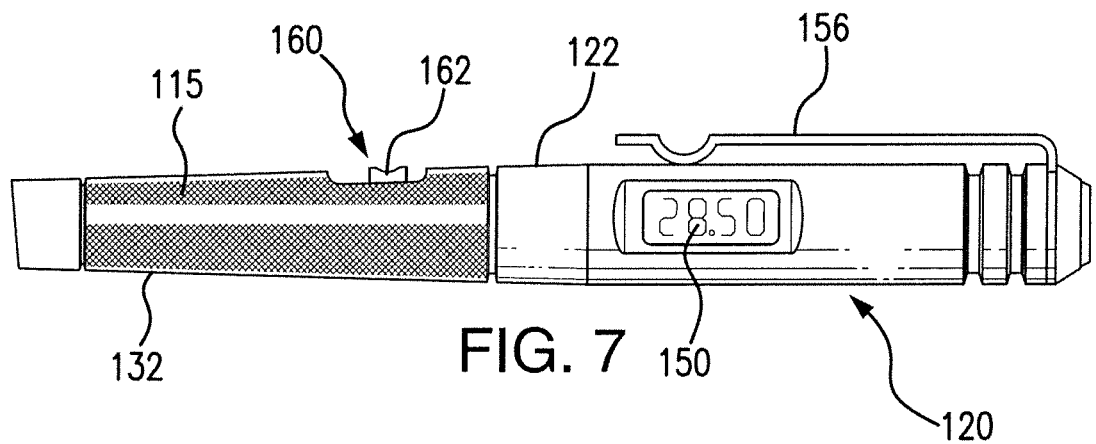
FIG. 7 is a side view of a pressure gauge according to one embodiment of this invention.

FIG. 7 illustrates a pencil gauge 120 according to another embodiment of this invention. The gauge 120 of FIG. 7 includes a patterned grip 115 along the tapered section 132 of the housing 122. The pressure release valve 160 includes a slide element 162 for manually opening the valve 160. The pressure release valve 160 is offset from the display 150 by 90 degrees, and is shown coaxially aligned with the clip 156 along a 'top' of the housing 122.

While in the foregoing specification this invention has been described in relation to certain preferred embodiments thereof, and many details have been set forth for purpose of illustration, it will be apparent to those skilled in the art that the device and placard are susceptible to additional embodi-

The invention claimed is:

1. A tire gauge, comprising:
   a pencil gauge housing;
   a nozzle inlet at a first end of the housing and adapted to receive a tire valve stem;
   a pressure detection mechanism disposed within the housing;
   a digital display attached to a side of the housing and in display combination with the pressure detection mechanism;
   a tapered section beginning at a midpoint along the housing and tapering toward the nozzle inlet from the midpoint; and
   wherein the nozzle inlet comprises a pin, and the nozzle inlet and the pin are each slanted at an angle of 0° to about 10° relative to and across a longitudinal centerline of the housing.

2. The tire gauge of claim 1, wherein the housing is cylindrical.

3. The tire gauge of claim 1, wherein the housing is a cast metal housing.

4. The tire gauge of claim 1, wherein a plane of the first end of the housing is formed at a non-perpendicular angle to the longitudinal axis of the housing and perpendicular to the pin.

5. The tire gauge of claim 1, wherein the first end of the housing comprises a light emitting diode.

6. The tire gauge of claim 1, wherein the housing comprises a sliding and/or spring loaded pressure bleeding valve.

7. The tire gauge of claim 1, wherein a second end of the housing comprises a battery compartment and a removable cap, wherein the cap comprises a bottle opener.

8. A tire gauge, comprising:
   a tubular pencil gauge housing having a first end and an opposite second end, and including a cylindrical section toward the second end and a tapered section extending from the cylindrical section toward the first end, wherein the first end has a diameter that is less than the second end;
   a nozzle inlet at the first end and adapted to receive a tire valve stem wherein the nozzle inlet is tilted offset across and at an angle α with respect to a longitudinal centerline of the housing of about 10° or less, and the first end is tilted offset across and at a non-perpendicular angle with respect to a linear longitudinal centerline of the housing;
   a pressure detection mechanism disposed within the housing;
   a digital display attached to a side of the cylindrical section and in display combination with the pressure detection mechanism.

9. The tire gauge of claim 8, wherein the nozzle inlet comprises a pin disposed at the angle to the longitudinal centerline, and a plane of a surface of the first end of the housing is offset to the centerline and perpendicular to the pin.

10. The tire gauge of claim 8, wherein the tapered section comprises a sliding and/or spring loaded pressure bleeding valve.

11. The tire gauge of claim 10, wherein the pressure bleeding valve is coaxially aligned with the digital display on an outer surface of the housing.

12. The tire gauge of claim 10, wherein each of the pressure bleeding valve and the digital display is setback in a corresponding recess in the outer surface of the housing.

13. The tire gauge of claim 10, wherein the first end of the housing comprises a light emitting diode.

14. The tire gauge of claim 13, wherein a second end of the housing comprises a battery compartment and a removable cap, wherein the cap comprises a bottle opener.

15. The tire gauge of claim 14, wherein the nozzle inlet is disposed slanted at an angle of 5° with respect to a longitudinal centerline of the housing, and the first end is offset with respect to a longitudinal centerline of the housing to be perpendicular to a centerline of the nozzle inlet.

16. The tire gauge of claim 15, further comprising a clip attached at the second end and extending along the cylindrical section.

17. A tire gauge, comprising:
   a metal pencil gauge housing having a first end and an opposite second end centered along a longitudinal centerline of the housing, the housing including a cylindrical section toward the second end and a tapered section extending from the cylindrical section toward the first end, wherein the first end has a diameter less than the second end;
   a nozzle inlet at the first end and adapted to receive a tire valve stem, the nozzle including a pin, wherein the first end, the nozzle inlet, and the pin are each intersected by the longitudinal centerline of the housing and each is slanted offset at an angle of about 2° to about 10° with respect to the housing;
   a digital display attached to a side of the cylindrical section; and
   a sliding and/or spring loaded pressure bleeding valve coaxially aligned with the digital display on an outer surface of the housing.

* * * * *